July 2, 1957
A. H. ROSENTHAL
2,797,619
AUTOCOLLIMATING ULTRASONIC LIGHT MODULATING DISPLAY MEANS
Filed Dec. 12, 1951
2 Sheets-Sheet 1
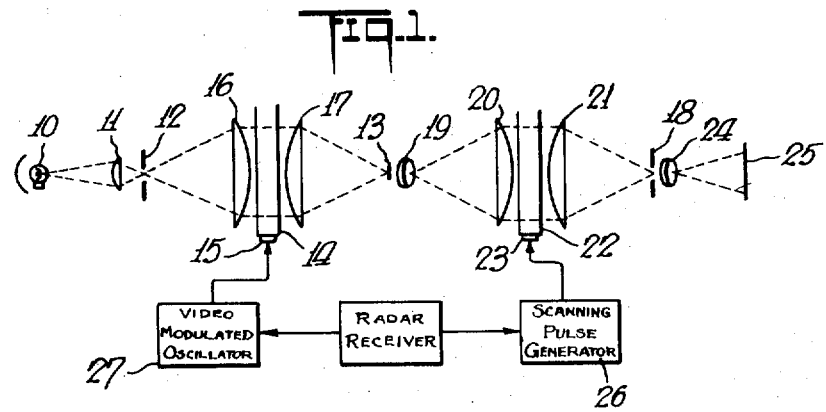
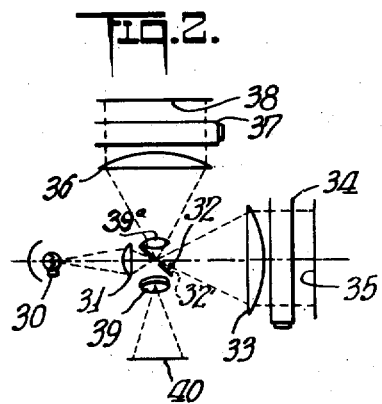
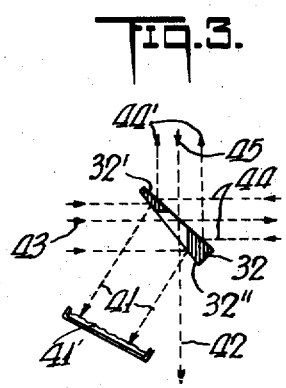
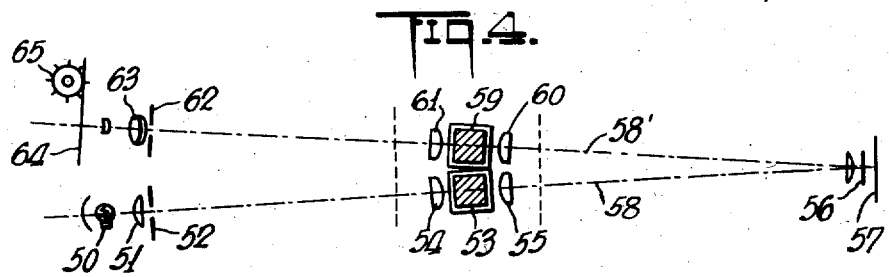
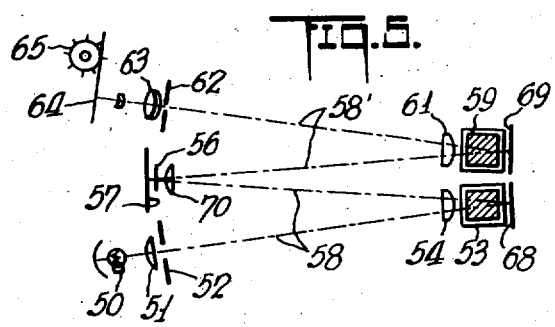
INVENTOR
Adolph H. Rosenthal
BY
Mitchell & Bechert
ATTORNEYS

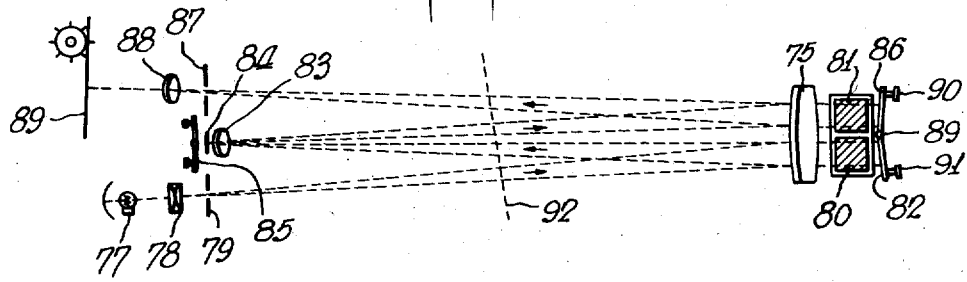
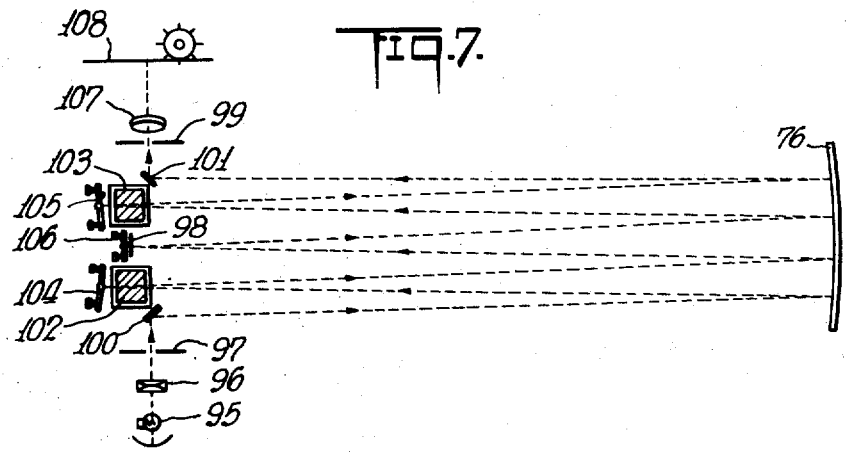
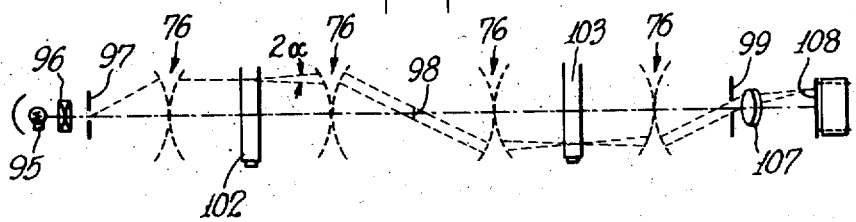

United States Patent Office

2,797,619
AUTOCOLLIMATING ULTRASONIC LIGHT MODULATING DISPLAY MEANS

Adolph H. Rosenthal, Forest Hills, N. Y., assignor to Fairchild Camera and Instrument Corporation, Syosset, N. Y., a Delaware corporation Application December 12, 1951, Serial No. 261,241

6 Claims. (Cl. 88—61)

This invention relates to optical display means employing so-called ultrasonic cells, and to means for scanning modulations imposed upon said cells.

It is an object of the invention to provide improved display means of the character indicated.

Another object is to provide relatively compact display means, particularly where substantial quantities of modulating intelligence are to be scanned in each scanning operation.

It is also an object to provide improved optics in a display device of the character indicated, whereby the number of optical components may be substantially reduced.

It is a further object to provide an improved arrangement of optical and other parts in a display device of the character indicated, whereby a more rugged integration of components may be effected.

It is a specific object to provide an improved radar display and recording means, inherently applicable to the visual display and recording of more extended radar-range data.

Other objects and various features of the invention will be pointed out or will occur to those skilled in the art from a reading of the following specification, in conjunction with the accompanying drawings. In said drawings, which show, for illustrative purposes only, preferred forms of the invention:

Fig. 1 is a simplified diagram schematically showing basic components of an optical display device, as for use in the display of radar-range intelligence;

Fig. 2 is another simplified diagram, schematically showing a modification of the parts of Fig. 1, by employment of what may be termed "cell autocollimation";

Fig. 3 is an enlarged sectional view of the diaphragm in the arrangement of Fig. 2, with ray designations to illustrate functioning of the arrangement of Fig. 2;

Fig. 4 is a simplified diagram schematically illustrating another arrangement of parts of Fig. 1, and embodying principles of what may be termed "diaphragm autocollimation";

Fig. 5 is a similar schematic view, illustrating an arrangement embodying both cell autocollimation and diaphragm autocollimation;

Figs. 6 and 7 are views illustrating devices incorporating simplifications over the device of Fig. 5; and Fig. 8 is an exploded diagram schematically illustrating the progressive development of rays in the system of Fig. 7.

Optical display devices, as herein contemplated, have usually included a large number of components. As illustrated in Fig. 1, a source of light 10 is imaged by a condenser lens 11 upon a first diaphragm 12, and this first diaphragm 12 is imaged upon a second diaphragm 13 by optics, including light-modulating means.

The first and second diaphragms 12 and 13 may be said to be complementary to each other, in the sense that in the absence of a disturbance in the light modulating means, any light passing the first diaphragm 12 will be completely stopped by the second diaphragm 13 (dark-field system); stated in other words, the image of the open areas of diaphragm 12 falls on closed areas of diaphragm 13. Diaphragm 12 may be a slit, and diaphragm 13 a bar, or vice versa; alternatively, the two diaphragms may contain identical or similar apertures (bright-field system). Thus, as to the two systems (dark-field and bright-field), it will be appreciated that one system gives a negative modulation compared to the other.

In the form shown, the first light modulating means includes an ultrasonic cell 14, comprising a transparent vessel filled with a fluid and excited at one end (to traveling ultrasonic waves) by electro-mechanical transducer means, such as a piezo-electric crystal 15. Collimating means, such as lenses 16—17, in front of and behind the cell 14, may assure the passage of parallel rays through the cell and over the length of the cell from which intelligence is to be extracted.

The second half of the system includes a third diaphragm 18, again complementary to the diaphragm 13 and having a slit or bar, as the case may be, upon which the bar or slit of diaphragm 13 is imaged by further optics including elements 20—21. In the form shown, lenses 20—21 are collimating and therefore establish parallel rays through a second light modulating cell 22, which may be energized by a crystal 23 and may be otherwise similar to the cell 14. A projection lens 24 may serve to image the full effective area of the light modulating cell 22 upon a moving film or viewing screen 25, for recording or display purposes, as desired. Lens system 19 forms an image of the first cell 14 upon or into the second cell 22. There will be no illumination of the screen surface 25 under these conditions. If cell 14 is excited by signals causing the crystal to vibrate, light rays crossing that cell (where ultrasonic waves traverse the liquid) will be diffracted, so as to cause modulation of light impinging upon that cell; but no light will pass through the complete system unless both cells are excited, and light will pass only to such parts of screen 25 where conjugate image points in both cells are excited.

In the form shown, I apply video intelligence to the first cell 22 and scanning-pulse signals to the second cell 14, whereby such intelligence and signals are used to modulate the carrier of the two crystals. Due to the fact that the image of cell 14 is reversed by lens 19, the excitation caused by a scanning pulse will effectively travel along one cell 22 in opposition to the image of the video-signal excitation of cell 14. Thus, every scanning pulse scans a certain cycle of video information which is projected upon the display or recording screen 25.

In application to radar systems, the cell 14 may be fed directly by the video-modulated oscillator 26 controlled by the radar receiver, and the scanning pulses may be derived from the radar repetition cycle and suitably shaped in a generator 27 for application to the cell 14. The display at 25 will then be a range display, over an effective range determined by the length of the cells 14—22. The scanning-pulse duration may be ⅙ microsecond, and the crystals 15 and 23 of the cells 14 and 22 may resonate at 15 or 20 megacycles per second.

In practice, the larger the range to be covered by the display system, the larger the required cell length must be, and, at the same time, the larger must be the dimensions of the collimating lenses 16—17—20—21. Larger widths for the collimating lenses usually also means larger focal lengths of these lenses (for the best relative apertures to which the system may be designed) and, of course, the total length of the complete system, as shown in Fig. 1, must be in excess of four times this relatively large focal length. Since it develops that one centimeter of cell length is substantially equivalent to one mile of radar range, the transverse dimension of the collimating optics will be seen to grow to relatively great proportions, even for moderate-range radars. Since these optical components have to be of high quality glass and well corrected, the price increases tremendously for large ranges.

My invention seeks to avoid or at least substantially to reduce these problems, including those of excessive length and cost, when relatively great quantities of information are to be scanned with each scanning cycle. I achieve my results by what may be termed "autocollimating methods." In brief, the system may be autocollimated at one or more of the cells, or at one or more of the diaphragms; in the most compact forms, utmost utilization is made of autocollimation, both at the cells and at the diaphragms.

Figs. 2 and 3 illustrate a relatively compact form embodying purely cell autocollimation. In this form, light from a source 30 passes through condenser means 31 for illuminating a 45°-inclined diaphragm 32, which may be a slit. The light passing through this slit is collimated by lens 33, for passage as parallel beams through a first light modulating cell 34 and to a plane mirror 35, which may be a reflecting coating on the back wall of the cell 34 but which, in the form shown, is a separate member immediately adjacent and behind cell 34. The reflected rays again pass through cell 34 and collimating lens 33, and in the absence of a disturbance or excitation in cell 34 these rays will pass directly back through the diaphragm slit to the source 30. However, when the cell 34 is excited, diffracted rays will not pass through the opening in diaphragm 32 but will be reflected from the mirror-coated backside 32' thereof (see Fig. 3), to a second collimating means 36, for collimated passage through the second cell 37, upon which the first cell 34 is imaged by lens 39a. A mirror 38 behind the cell 37 serves to fold the optics again for passage of diffracted light through diaphragm 32 to the projecting lens 39, for viewing or recording at a screen 40 or the like.

In operation, the functioning of the two cells 34—37 will be as described in Fig. 1 for the cells 14—22, so that light will only be projected at 40 when corresponding conjugate locations in both cells are simultaneously energized. Cell autocollimation is seen in this form to effect a substantial reduction in the required dimensions, and the system will be substantially as long as it is wide, both these dimensions being something in excess of the focal length of the collimating lenses 33—36.

Fig. 3 illustrates that the diaphragm 32, in Fig. 2, may be so formed as to minimize deleterious effects occasioned by reflections from the source 30 directly off the front side of diaphragm 32 and to the screen 40. A mere coating of felt or other light-attenuating means on this front side may reduce such reflections, but in the form shown in Fig. 3 I construct the diaphragm 32 as a tapering wedge, the backside 32' being mirror-coated, as previously described, and inclined at 45° to the axes of the respective collimating lenses 33—36. With this construction, the front side 32" of the diaphragm 32, which also may be mirror-coated, will be inclined at something greater than 45° to the incident light, so that reflections, as indicated by the rays 41, may be directed out of alignment with the rays 42 that are to be projected for viewing towards an absorber 41'. Arrows on the various rays shown in Fig. 3 illustrate the course of these rays when both cells of the system of Fig. 2 operate. Only the central rays 43 from the source 30 will pass through the diaphragm slit to the cell 34, and only the diffracted rays 44 emanating from collimating means 33 will be reflected, as rays 44', to the cell 37. Again, only diffracted rays emanating from the collimating means 36 will appear centrally, as at 45, to pass through the slit of diaphragm 42 for display on screen 40.

In Fig. 4, I illustrate a modification of the construction of Fig. 1, embodying purely diaphragm autocollimating methods. In this construction, rays from a light source 50 illuminated (by means of a condenser 51) the first diaphragm means 52, thence pass a first ultrasonic cell 53 and its collimating lenses 54—55, to a second diaphragm 56 complementary to the first diaphragm 52. (For simplicity of presentation, the cells 53—59 of Fig. 4 have been shown schematically in section, representing an orientation perpendicular to the views of cells in Figs. 1, 2, and 8; similar sectional views are also shown in Figs. 5, 6, and 7.) A plane mirror 57, behind diaphragm 56, folds the system at this point. By slightly inclining the optical axis 58 of the described parts away from a normal to the plane of mirror 57, there may be established a reflected continuation of the axis at 58', for containment of the second cell 59, its associated collimating lenses 60—61, the third diaphragm 62, and the projecting and recording means 63—64. In the form shown, the recording means 64 is a film advanced by a sprocket wheel 65. The operation of the construction of Fig. 4 will be seen to be the optical parallel of Fig. 1 and, therefore, need not be discussed further. However, it will be noted that the Fig. 4 construction need occupy only about half the length of the Fig. 1 arrangement.

In Fig. 5, I illustrate a further reduction in size of the complete system, by employment of both cell autocollimation and diaphragm autocollimation. The system resembles that of Fig. 4 in all respects, except that plane reflecting mirrors 68—69 have been substituted for collimating lenses 55—60 on one side of the two ultrasonic cells 53—59. Corresponding parts in the two systems have, therefore, been referenced with the same reference numerals in Figs. 4 and 5.

Though the functioning of the systems of Figs. 4 and 5 will be similar, it can be seen that the length of the system of Fig. 5 is against halved, as compared to Fig. 4; also, only two instead of four collimating lenses need be used.

In spite of the space-saving and lens-saving features of the multiple collimation of Fig. 5, still further lens economies may be achieved, and in Figs. 6 and 7 I illustrate systems in which a single piece of collimating optics may serve the entire system. In Fig. 6, this single element 75 is a lens, and in Fig. 7, this single element 76 is a collimating mirror.

In Fig. 6 light from a source 77 illuminates (by means of condenser means 78) a first diaphragm 79, and an eccentrically located portion of the collimating lens 75 converts this bundle of rays into parallel rays for passage through the first (80) of two light modulating cells 80—81. First mirror means 82, behind the cell 80, reflects these rays back through the cell 80, and the same eccentrically located part of the lens 75, for convergence onto a second diaphragm 84. A mirror 85 behind diaphragm 84 reflects the rays to another part of the collimating lens 75, for passage through the second cell 81 and reflection back from another inclined mirror 85 through cell 81 and lens 75 onto the third diaphragm 87, and for projection by lens 88 upon screen or recording means 89. The mirrors 82—86 may be independently adjustably inclined at point 89, as by means 90—91, in order to compensate for prismatic deflection occasioned by eccentric employment of lens 75. The mirror 85 may include similar adjustment features. As with the previously described systems, a lens (83) between modulating units serves to image the first cell 80 upon the second cell 81.

The principal advantage of the arrangement of Fig. 6 is the reduction in number of large size, expensive, and difficult-to-obtain collimating lenses, from the original four to the minimum of only one. Of this lens, only a rectangular part is used. This part may be cut out from the whole circular lens, one side being determined by the range, as above explained, the other side being somewhat larger than the width of the two ultrasonic cells 80—81. If desired, these two cells 80—81 may be combined into one body, as suggested by the drawing. Further, all optical parts may be rigidly assembled on two mounts which are separated by a distance substantially equal to the focal length of the collimating lens 75; one mount may contain the cells 80—81, the reflectors 82—85, and the lens 75, while the other mount contains the remaining parts. Since the focal length will be large compared to the lateral extensions perpendicular to the cell length (as shown in plane of Fig. 6), the three diaphragms 79—84—87 can be substantially in one plane or unit, aligned or combined with each other.

If desired, a further size reduction may be effected by folding the Fig. 6 arrangement between the diaphragm mount and the cell mount, as schematically indicated by the line 92; two 45° mirrors or, alternatively, a single inclined mirror may serve this purpose, depending upon space considerations, as will be understood. Such a fold could bring all the essential optical parts relatively near to each other and permit mounting them on a relatively small rigid base.

As indicated generally above, Fig. 7 also embodies a single collimating optical unit, in two-cell constructions of the character under consideration. By employment of a concave mirror 76, all critically adjustable parts may be mounted at one end of the system, the mirror 76 being the only element at the far end of the system. In brief, the elements in Fig. 7 include a light source 95, condenser lens 96, and first, second and third diaphragms 97—98—99, respectively. Two 45° mirrors 100—101 may be utilized to avoid excessive elongation of the system attributable to the light source and to its condenser on the one hand, and to the projection and display system on the other hand. Two ultrasonic cells 102—103 are autocollimated by independently adjustable plane mirrors 104—105, and the diaphragm 98 is autocollimated by a mirror 106 corresponding to the mirror 85 of Fig. 6.

As distinguished from the lens collimating system of Fig. 6, the mirror 76 of the mirror collimating system of Fig. 7 accomplishes two imaging functions at once; it not only collimates the beams from and onto the diaphragms, imaging the diaphragms one onto the other, but also effects the important function of imaging one ultrasonic cell upon the other. This is more clearly seen in the exploded schematic of Fig. 8, in which the optical paths are unfolded about mirror 76, which therefore appears four times. Light from the source 95 is condensed by lens 96 upon diaphragm 97. The imaging of diaphragm 97 upon diaphragm 98 is effected by the first reflection on mirror 76, making the divergent beams of each point of diaphragm 97 parallel through the first cell 102, and then, after a reflection at mirror 104 and a second reflection on mirror 76, making these parallel beams convergent upon diaphragm 98. Diaphragm 98 is similarly imaged upon diaphragm 99, and the modulated light is projected by lens 107 to the viewing or recording means 108.

The imaging of one cell 102 upon the other 103 is effected by two reflections on mirror 76; the first of these reflections parallelizes each divergent beam from any point of cell 102 over diaphragm 98 and reflector 106, and at the second reflection (on mirror 76) this parallel beam is converged onto the conjugate image point of cell 103. The angular divergence from any point of cell 102 will be very small, and is determined by the diffraction angle α, the total divergence in the plane shown being 2α (the diffraction angle α for the first-order diffraction for a 15 mc./s. carrier is approximately 20'). This small divergence may be considered a favorable factor for the design of the optical system, since it considerably reduces the optical aberrations.

The single collimating mirror of Fig. 7, whether spherical or parabolic, will be seen to have the inherent advantage of freedom from chromatic aberrations. Also, this construction will not present any difficulties with regard to freedom from internal bubbles and inhomogeneities in glass blanks; this is an important consideration for the lens system of Fig. 6, but in Fig. 7 only the metallized mirror surface of the blank is used.

The present autocollimation or light-folding methods, resulting in savings of space and components, can be employed in my co-pending patent application Serial No. 217,104, filed March 23, 1951. In Fig. 4 of the said application, the optical arrangement essentially corresponds to the present Fig. 1, and can accordingly be similarly developed and simplified corresponding to the present Figs. 2 to 7, inclusive.

It will be seen that I have disclosed improved optical display and recording means, permitting the presentation of substantial quantities of intelligence in each scanning cycle. My constructions also drastically reduce the required number of expensive optical components and the required overall size of the display device, and adaptability to more rugged configurations is inherently obtained. Apart from the savings in space and components, my employment of cell autocollimation effects a higher efficiency of the ultrasonic light modulation, because double passage through a given cell can produce a given amount of diffracted light with only half the intensity of crystal excitation required for passage of a single beam through the cell; this factor may make possible considerable simplification of the required high-frequency circuits.

Although, in the present forms, it has been indicated to apply the short-time scanning or immobilizing pulse directly to the second ultrasonic cell (i. e., the cell farthest from the light source), this procedure can be reversed; the video-signal modulation may be applied to the second cell and the short-time pulse to the first cell (i. e., the cell nearest the light source). Ordinarily, however, in radar applications, it may be preferred to use the first cell for the video modulation, and the second cell for the scanning impulses.

While I have described my invention in detail for the preferred forms shown, it will be understood that modifications may be made within the scope of the invention, as defined in the claims which follow.

I claim:

1. Light-modulating display means, comprising in combination, optics including a source of light, diaphragm means, light modulating means including two adjacent ultrasonic cells on separate divergent axes, mirror means folding said divergent axes optically between said cells, whereby separate convergent axes are developed, said mirror means orienting said convergent axes for intersection, and collimating means including a single optical element eccentrically intercepting said divergent axes and said convergent axes, said diaphragm means including a single diaphragm element substantially at said intersection.

2. A light modulating display device according to claim 1, in which said single optical element is generally rectangularly shaped; in one dimension, at least the useful combined effective width of said cells; in the other dimension, at least the effective transverse optical span of said cells.

3. Light-modulating display means, comprising in combination, two ultrasonic-cell light-modulating units, a source of light, optics including said light-modulating units and including diaphragm means effective upon excitation of said light-modulating units to control the passage of a predetermined fraction of the light passing portions of said light-modulating units to an image-receiving surface, said diaphragm means including a diaphragm optically between said cells and a diaphragm optically on the other side of one of said cell units, means folding said optics at said single diaphragm, and autocollimating means optically between said cell units, said autocollimating means comprising a single autocollimating optical element common to beams incident to and reflected by said folding means and imaging one of said cell units on the other of said cell units.

4. Light-modulating display means according to claim 3, in which said single optical element is also common to beams entering and leaving said one cell unit and imaging one of said diaphragms on the other of said diaphragms.

5. Light-modulating display means according to claim 3, in which said single optical element is a lens.

6. Light-modulating display means according to claim 3, in which said single optical element is a concave mirror.

References Cited in the file of this patent

UNITED STATES PATENTS

| | | |
|---|---|---|
| 1,727,173 | Muller | Sept. 3, 1929 |
| 1,783,998 | Chretien | Dec. 9, 1930 |
| 1,792,752 | Michelssen | Feb. 17, 1931 |
| 2,036,499 | Rantsch | Apr. 7, 1936 |
| 2,083,292 | Cawley | June 8, 1937 |
| 2,118,160 | Cawley | May 24, 1938 |
| 2,153,010 | Snook | Apr. 4, 1939 |
| 2,155,659 | Jeffree | Apr. 25, 1939 |
| 2,225,097 | Cawley | Dec. 17, 1940 |
| 2,513,520 | Rosenthal | July 4, 1950 |
| 2,578,601 | Rosenthal | Dec. 11, 1951 |